United States Patent
Rivlin

(10) Patent No.: US 11,757,626 B1
(45) Date of Patent: Sep. 12, 2023

(54) DETERMINISTIC CRYPTOGRAPHY DEIDENTIFICATION WITH GRANULAR DATA DESTRUCTION

(71) Applicant: CyberArk Software Ltd., Petach-Tikva (IL)

(72) Inventor: Ofer Rivlin, Petach-Tikva (IL)

(73) Assignee: CYBERARK SOFTWARE LTD., Petach-Tikva (IL)

(*) Notice: Subject to any disclaimer, the term of this patent is extended or adjusted under 35 U.S.C. 154(b) by 0 days.

(21) Appl. No.: 17/674,118

(22) Filed: Feb. 17, 2022

(51) Int. Cl.
*H04L 9/08* (2006.01)
*G06F 21/62* (2013.01)
*H04L 9/32* (2006.01)

(52) U.S. Cl.
CPC ........ *H04L 9/0825* (2013.01); *G06F 21/6263* (2013.01); *H04L 9/0869* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 6,546,385 B1 * | 4/2003 | Mao | G06F 16/30 707/711 |
| 2007/0276845 A1 * | 11/2007 | Geilich | G06F 16/29 |
| 2019/0349360 A1 * | 11/2019 | Yeddula | H04L 63/10 |
| 2020/0327252 A1 * | 10/2020 | McFall | G06F 21/78 |
| 2020/0334639 A1 * | 10/2020 | Ramakrishnan | H04L 51/08 |
| 2020/0389297 A1 * | 12/2020 | Singh | H04L 9/3273 |
| 2021/0209251 A1 * | 7/2021 | Parthasarathy | G06F 21/602 |
| 2021/0390546 A1 * | 12/2021 | Deignan | G06Q 20/409 |
| 2022/0029969 A1 * | 1/2022 | Kravitz | G06F 21/6227 |
| 2022/0067206 A1 * | 3/2022 | Lindsay | G06F 40/284 |

* cited by examiner

*Primary Examiner* — Bassam A Noaman
(74) *Attorney, Agent, or Firm* — FINNEGAN, HENDERSON, FARABOW, GARRETT & DUNNER LLP

(57) ABSTRACT

Disclosed embodiments relate to systems and methods for deterministic cryptography deidentification enabling granular destruction. Techniques include preparing a table of name-token pair groupings with unique tokens, storing data deidentified in association with the deidentification process in a centralized repository, identifying a token from the table of name-token pair groupings, and enabling reidentifying of a specific data item of the deidentified data based on the token provided from the table.

16 Claims, 4 Drawing Sheets

DETERMINISTIC CRYPTOGRAPHY DEIDENTIFICATION WITH GRANULAR DATA DESTRUCTION

BACKGROUND

Lookup-table-based tokenization schemes for de-identification (instead of, e.g., cryptographic encryption and decryption) can achieve destruction of data. However, to also keep data items unique, the granularity that is possible with lookup tables is limited to item-level granularity, rather than group-level granularity. In a lookup table, each item gets its own table row, which involves a memory consumption of Big O of (n). Lookup tables are thus not a preferred cloud solution due to scaling issues at large volumes.

Personal identifiable information (PII) data, as well as any other type of sensitive data, should be protected. This may include, for example, biological, social, economic, or other data that is sensitive to individuals. Likewise, other sensitive types of data (e.g., business data, server logs, testing data, communication data, etc.) may also need to be protected. Sensitive data of these types can be masked in many ways to ensure protection. If an analysis is performed on the data in the cloud and then returned to a customer through a data analysis, any specific identifying information should be deidentified before the data is processed in the cloud. However, the information should be re-identified when returned to the customer or other owner. Re-identification (a reversal of the de-identification) is possible when the de-identification occurs using cryptographic encryption of the data. Re-identification occurs by using decryption of the encrypted data.

Crypto-shredding is a process that destroys data by destroying the cryptographic keys that protect the data. Data sets that are protected entirely by one cryptographic key will in turn be destroyed in their entirety when the cryptographic key is destroyed. However, having separate cryptographic keys for each data item results in large and burdensome overhead, which can be complex and expensive. In view of this overhead, granularity may be desired, such as through having separate groups of data, e.g., data separated according to month and year. Each data item must be unique and different from each other to differentiate each item. This differentiation can be achieved through deterministic encryption.

In view of these issues, there are technological needs for systems and methods to perform operations for deterministic cryptographic identification for granular data destruction. Advantageously, technological solutions should be able to precisely perform de-identification and re-identification of data without destroying an entire data set and without destroying one cryptography key. Further, solutions should use a combination of deterministic encryption together with separating data via groups to enable granular destruction. Additional technological problems and corresponding solutions are addressed in the following detailed description.

For example, a de-identification process may involve encrypting sensitive data such as a person's name and all sensitive data associated with that person's name. The person's information may all be associated with, for example, a specific username. The encryption process may use the same encryption key for the person's specific username, and upon completion of the analysis the results may be returned to the person, where only the person can reidentify the data based on the specific username.

SUMMARY

The disclosed embodiments describe non-transitory computer readable media, systems, and methods for deterministic cryptography deidentification enabling granular destruction. For example, in an exemplary embodiment, there may be a non-transitory computer readable medium including instructions that, when executed by at least one processor, cause the at least one processor to perform operations for deterministic cryptography deidentification enabling granular destruction. The operations may comprise preparing a table of name-token pair groupings with unique tokens, wherein the name-token pair groupings are configured to be used in a deidentification process; storing data deidentified in association with the deidentification process in a centralized repository; identifying a token from the table of name-token pair groupings; and enabling reidentifying of a specific data item of the deidentified data based on the token provided from the table.

According to a disclosed embodiment, the operations further comprise disposal of the token from the table of name-token pair groupings.

According to a disclosed embodiment, the deterministic cryptography is performed via authenticated encryption with associated data cryptography.

According to a disclosed embodiment, the data includes personal identifiable information.

According to a disclosed embodiment, the table of name-token pair groupings is prepared by a cryptography random generator.

According to a disclosed embodiment, the table of name-token pair groupings includes {group-name: group:token} pairs.

According to a disclosed embodiment, the deidentification of data uses the table of name-token pair groupings.

According to another disclosed embodiment, there may be a non-transitory computer readable medium including instructions that, when executed by at least one processor, cause the at least one processor to perform operations for granular destruction of data deidentified by deterministic cryptography. The operations may comprise preparing a table of name-token pair groupings with unique tokens, wherein the name-token pair groupings are configured to be used in a deidentification process; deidentifying data using the table of name-token pair groupings; storing data deidentified in association with the deidentification process in a centralized repository; disposing of a token of the table of name-token pair groupings.

According to a disclosed embodiment, the operations further comprise identifying the token from the table of name-token pair groupings; and enabling reidentifying of a specific data item of deidentified data associated with the deidentification process based on the token provided from the table.

According to a disclosed embodiment, the data includes personal identifiable information.

According to a disclosed embodiment, the deterministic cryptography is performed via authenticated encryption with associated data cryptography.

According to a disclosed embodiment, the table of name-token pair groupings is prepared by a cryptography random generator.

According to a disclosed embodiment, the table of name-token pair groupings includes {group name: group-token} pairs.

According to a disclosed embodiment, the token is smaller in size than the encryption key used in the deidentification process.

According to another disclosed embodiment, a method may be implemented for deterministic cryptography deidentification enabling granular destruction. The method may comprise preparing a table of name-token pair groupings with unique tokens, wherein the name-token pair groupings are configured to be used in a deidentification process; storing data deidentified in associated with the deidentification process in a centralized repository; identifying a token from the table of name-token pair groupings; and enabling reidentifying of a specific data item of the deidentified data based on the token provided from the table.

According to a disclosed embodiment, the method further comprises disposing of the token from the table of name-token pair groupings.

According to a disclosed embodiment, wherein the data includes personal identifiable information.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques discussed herein overcome several technological needs for systems to perform operations for deterministic, cryptographic identification enabling granular destruction of data. In prior techniques, destruction of a cryptography key may result in destruction of an entire data set being protected via encryption. Such destruction of data may be desired for many reasons, including compliance with privacy regulations, such as the General Data Protection Regulation (GDPR). Data destruction may also be desired to comply with corporate privacy policies, data retention policies, server maintenance, or various other reasons. According to prior techniques, however, using one cryptographic key for each data item often results in a large overhead, making those approaches inefficient and inflexible. Prior systems also often require granularity at a grouping level, and thus are not truly or adequately granular at all. In contrast to such inadequate approaches, there are needs for deterministic encryption techniques to identify each data item. These and related security and efficiency problems are addressed by the disclosed embodiments herein.

Reference will now be made in detail to the disclosed embodiments, examples of which are illustrated in the accompanying drawings.

Figure 1:
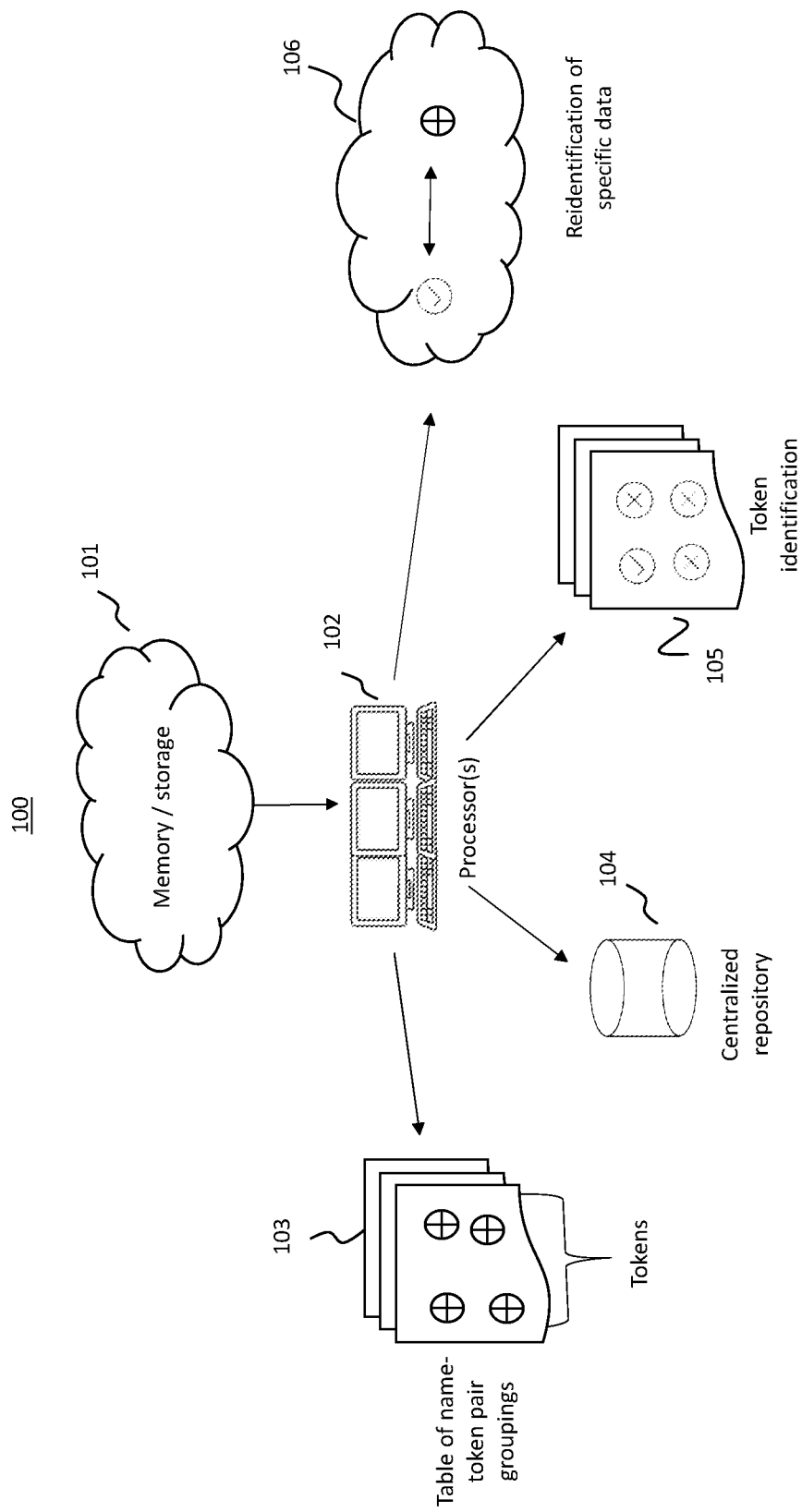
FIG. 1 is a block diagram of an exemplary system for performing operations for deterministic cryptographic deidentification enabling granular destruction of data, consistent with disclosed embodiments.

FIG. 1 is a block diagram of an exemplary system 100 for deterministic, cryptographic deidentification enabling granular destruction of data. In accordance with system 100, a memory or storage device (e.g., including one or more non-transitory computer readable medium) 101 includes instructions that are to be executed by at least one processor (e.g., processor(s) 102). The processor(s) 102 may take the form of, but is not limited to, a microprocessor, embedded processor, or the like. According to some embodiments, processor(s) 102 may be from the family of processors manufactured by Intel®, AMD®, Qualcomm®, Apple®, NVIDIA®, or the like. The processor(s) 102 may also be based on the ARM architecture, a mobile processor, or a graphics processing unit, etc. The disclosed embodiments are not limited to any particular type of processor(s) 102 in system 100. As discussed herein, the processor(s) 102 may perform operations for deterministic cryptographic deidentification enabling granular destruction. These operations are discussed in more detail below.

Memory 101 may include one or more storage devices configured to store instructions used by the processor(s) 102 to perform functions related to deterministic cryptographic deidentification described herein. The disclosed embodiments are not limited to particular software programs or devices configured to perform dedicated tasks. For example, the memory 101 may store a single program, such as a user-level application, that performs the functions associated with the disclosed embodiments, or may comprise multiple software programs. Additionally, the processor(s) 102 may, in some embodiments, execute one or more programs (or portions thereof). Furthermore, memory 101 may include one or more storage devices configured to store data for use by the programs. Memory 101 may include, but is not limited to, a hard drive, a solid state drive, a CD-ROM drive, a peripheral storage device (e.g., an external hard drive, a USB drive, etc.), a network drive, a cloud storage device, or any other storage device.

Figure 2:
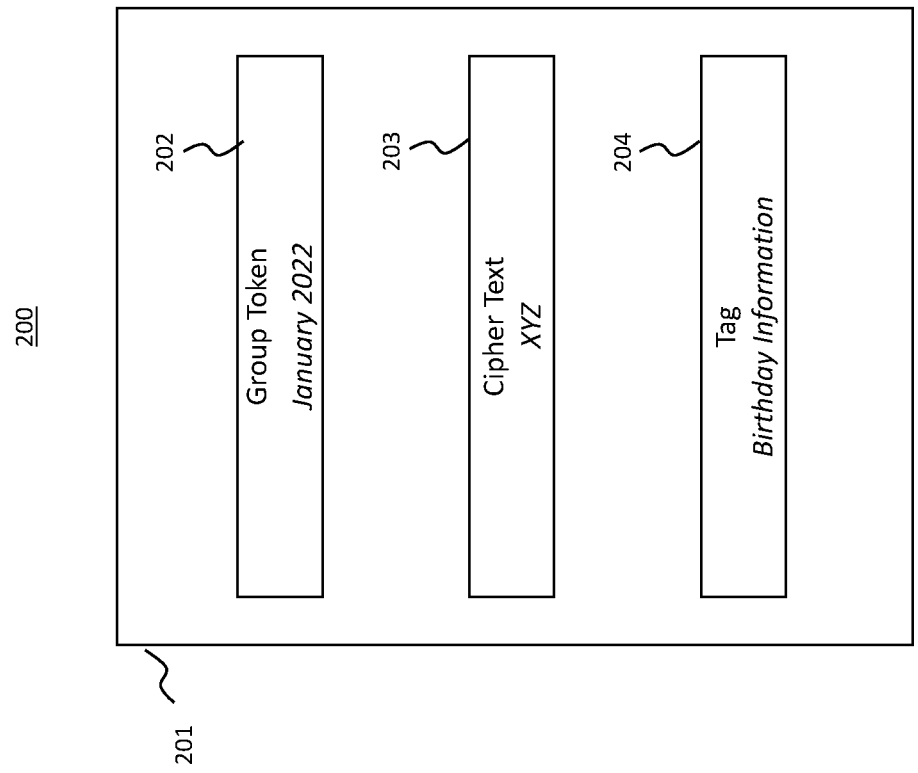
FIG. 2 is a block diagram of an example grouping of name-token pairs, consistent with disclosed embodiments.

In accordance with disclosed embodiments, these operations performed by processor(s) 102 may include preparing a table of name-token pair groupings 103. FIG. 2 further depicts an example of a table of name-token pair groupings 201. Within the table of name-token pair groupings 201 are examples of potential groupings, including a group token 202, cipher text 203, and a tag 204. The table of name-token pair groupings 103 may configure the groupings for use in a deidentification process. The data deidentified in association with the deidentification process may be stored in centralized repository 104. The processor(s) 102 may also perform an operation for token identification 105 from the table of name-token pair groupings. The processor(s) 102 may also perform an operation for reidentification of specific data 106 based on the token identification 105.

Aspects of this disclosure may include preparing a table of name-token pair groupings 103 with unique tokens. For example, the table may include a set of data arranged in rows and columns. Other formats of data organization are possible as well. The table of name-token pair groupings 103 and centralized repository 104 may be included on one or more volatile or non-volatile, magnetic, semiconductor, tape, optical, removable, non-removable, or other type of storage device or tangible or non-transitory computer-readable medium. Table of name-token pair groupings 103 and centralized repository 104 may also be part the same server or cluster of servers, or disparate servers. Table of name-token pair groupings 103 and centralized repository 104 may include one or more memory devices that store data and instructions used to perform one or more features of the disclosed embodiments. Table of name-token pair groupings 103 and centralized repository 104 may include any suitable databases, ranging from small databases hosted on a work station to large databases distributed among data centers. Table of name-token pair groupings 103 and centralized repository 104 may also include any combination of one or more databases controlled by memory controller devices (e.g., server(s), etc.) or software. For example, table of name-token pair groupings 103 and centralized repository 104 may include document management systems, Microsoft SQL™ databases, SharePoint™ databases, Oracle™ databases, Sybase™ databases, other relational databases, or non-relational databases, such as mongo and others.

In some embodiments, a token may include an object that represents the right to perform an operation, including but not limited to security, access, and control. In some embodiments, the right to perform an operation may also identify an identity that is able to perform the operation. For example, an identity may be referenced according to a security policy or access-control policy to determine whether the identity can perform an operation. According to some embodiments, a unique token may include an exclusive or particular object that represents the right to perform an operation, including but not limited to security, access, and control.

In some embodiments, a name-token pair grouping may include a character string (name) with a randomly generated string (token). Each name-token pair grouping may be unique. For example, a name-token pair grouping may use the name of a project, person, company, date-stamp, time-stamp, etc.

In some embodiments, system 100 may prepare a table of names and tokens that are grouped together, and each token may be unique. As shown in FIG. 2, table 200 shows an exemplary format of name-token groupings. Other formats of name-token groupings are possible as well.

The name-token pair groupings 103 may be configured to be used in a deidentification process, as described further below (e.g., in the processes of FIG. 3 and FIG. 4). For example, a deidentification process may include detecting identifiers that directly or indirectly point to a person, entity, or object, and deleting those identifiers from the data. By deleting the identifiers, the underlying data may be effectively and granularly deidentified.

In some embodiments, the configuration may include several steps. For example, this may include creating the name-token pair grouping 103, as shown in FIG. 2. Further, this may include retrieving a token from the name-token pair grouping 103 (e.g., based on the name value). This may also include marking the data with the selected token. The marking may be done cryptographically or otherwise.

In some embodiments, the table of name-token pair groupings 103 may be prepared by a cryptography random generator. For example, a cryptography random generator may include a process for creating cryptographically strong random values. This may be performed using, for example, a cryptographically secure pseudorandom number generator (CSPRNG) or cryptographic pseudorandom number generator (CPRNG). The values produced by the cryptography random generator should exhibit properties including, but not limited to, appearing random, being unpredictable in advance, and not being reliably reproduced after generation.

In some embodiments, the table of name-token pair groupings 103 may be created by randomly assigning each name-token pair grouping based on the output of a cryptographic random generator (e.g., CSPRNG, CPRNG, or the like). As an illustration, the table of name-token pair groupings may include {group-name: group-token} pairs. For example, the group name may include the name of a month, and the group token may be a randomly generated string, as discussed above.

Aspects of this disclosure may include storing data deidentified in association with the deidentification process in a centralized repository 104. In some embodiments, centralized repository 104 may include a collection of stored data from existing databases that is deployed by consolidating data from multiple sources. For example, a centralized repository 104 may include a data lake, a data warehouse, or other types of data storage. The centralized repository 104 may thus be based on architectures such as AWS Data Lake™, Google Data Lake™, Azure Data Lake™, Cloudera Data Platform™, Databricks Unified Analytics Platform™, or others.

In some embodiments, the data may include personal identifiable information. The data may also include other types of sensitive business, biological, social, technical, or economic data. Further, the data may include sets of values of qualitative or quantitative variables about one or more persons, entities, or objects. In some embodiments, personal identifiable information may include any representation of information that permits the identity of an individual, entity, or object to whom the information applies to be reasonably inferred by either direct or indirect means. For example, personal identifiable information may include, but is not limited to, a passport number, financial account number, or a driver's license number, among many other types.

In some embodiments, the deidentification process may involve deidentification of sensitive data. Sensitive data may include data that contains personal identifiable information or other confidential data, as discussed above. This process may include encrypting the personal identifiable information data before fetching the data. For example, the encryption may be done symmetrically (e.g., using techniques such as AES, Blowfish, CASTS, RC4, DES, 3DES, etc.) or asymmetrically (e.g., using techniques such as Diffie-Hellman, DSS, RSA, YAK, etc.).

In some embodiments, the deidentification process further comprises use of an encryption key (symmetric or asymmetric) and a tag. For example, a deidentification process may include detecting identifiers that directly or indirectly point to a person, entity, or object, and deleting those identifiers from the data. An encryption key may include a piece of information, usually a string of numbers or letters that are stored in a file, which, when processed through a cryptographic algorithm can encode or decode cryptographic data. A tag may include a keyword or term assigned to a piece of information. Of course, other examples of encryption keys and tags are possible as well.

In some embodiments, the encryption key is randomly generated by a cryptographically secure pseudorandom number generator (CSPRNG) or cryptographic pseudorandom number generator (CPRNG), as discussed above. The tag may also be, for example, randomly generated by a cryptographically secure pseudorandom number generator (CSPRNG) or cryptographic pseudorandom number generator (CPRNG). The tag may also be secured using hashing. Hashing may include changing a plain text or a key value to a hashed value by applying a hash function. The hash function may be, for example, based on CRC (16/32/64), Alder-32, BSD, sum (8/16/24/32), fletcher (4/8/16/32), or various other techniques. Hashing prevents tampering with the tag. In some embodiments, the encryption key may be attached to the tag. This attachment can be useful in the decryption process. The token may be smaller in size than the encryption key used in the deidentification process.

Aspects of this disclosure may include identifying a token from the table of name-token pair groupings 103. For example, the token may be identified based on the corresponding name or another identifier. In accordance with the techniques discussed below, aspects may also include enabling reidentifying of a specific data item of the deidentified data based on the token provided from the table of name-token pair groupings 103.

In some embodiments, a data item may include a single unit of data in a storage record and can include the smallest possible unit of information or a single entry or field of data. A data item may include personal identifiable information or other sensitive information, as discussed above. For example, "JSmith" and "JDoe" are data items that might be associated with a person's name. As described herein, deidentified data may include data from which all personally identifiable information has been removed.

In some embodiments, a token may include an object that represents the right to perform an operation, including but not limited to security, access, and control. The token can be random or pseudo-random characters, as discussed above. In some embodiments, a table (e.g., table 103) may include a set of data arranged in rows and columns. When data is deidentified, as discussed below, this may mean that the token from the table of name-token pair groupings 103 is disposed of (e.g., deleted or moved). In some embodiments, disposing of the token may include transferring the token to the control of another (e.g., application, server, third-party, etc.), to get rid of, to place, to distribute, or to arrange in an orderly way.

In some embodiments, a token may include an object that represents the right to perform an operation, including but not limited to security, access, and control. This may be based on, for example, a security policy, security group memberships, a least-privilege security framework, etc. In some situations, the rights to perform operations may be based on an Active Directory™ framework, CyberArk Privileged Access Management™ framework, AWS Identity and Access Management™ framework, or others.

In some embodiments, a name-token pair grouping may include a character string (name) with a randomly generated string (token). Each name-token pair grouping may be unique. For example, a name-token pair grouping may be the name of a project. For example, consistent with FIG. 2, a table of name-token pair groupings 201 may include a group token 202, cipher text 203, and a tag 204, as discussed above.

Consistent with the embodiments herein, a deterministic cryptography technique may be performed via authenticated encryption with associated data cryptography. Deterministic cryptography may include a type of encryption that repeatedly produces the resulting converted information given the same source text and key. Examples include RSA and block ciphers, among others as noted above. In some embodiments, deterministic cryptography may include the practice and study of techniques for secure communication. Further, as discussed herein authenticated encryption with associated data may include a type of encoding that allows a recipient to check the integrity of both the encrypted and unencrypted information in a message.

As discussed herein, stored data may be deidentified according to various techniques. Data may be deidentified using the table of name-token pair groupings 103 discussed above. In some embodiments, deidentifying data may include detecting identifiers that directly or indirectly point to a person, entity, or object, and deleting those identifiers from the data. As discussed herein, data may include sets of values of qualitative or quantitative variables about one or more persons, entities, or objects.

Figure 3:
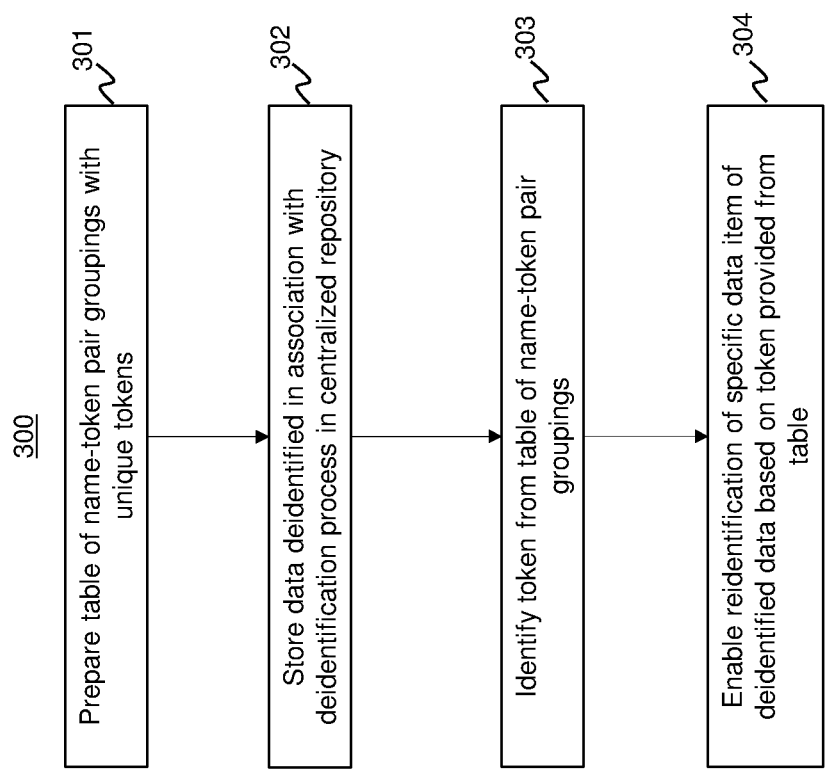
FIG. 3 illustrates an exemplary flowchart of a method for deterministic cryptographic deidentification enabling granular destruction of data, consistent with disclosed embodiments.

FIG. 3 is a block diagram of an exemplary method 300 performed by a processor of a computer or computer-based system, consistent with disclosed embodiments. In accordance with the discussion above, process 300 may be carried out at centralized repository 103, memory 101, processor(s) 102, or a separate computing system. For example, in some embodiments process 300 may be performed by a data security application running at processor(s) 102.

Operation 301 may include preparing a table of name-token pair groupings 103 with unique tokens, for use in a deidentification process. For example, as illustrated in FIG. 2, the table of name-token pair groupings 201 may include a group token 202, cipher text 203, and a tag 204. The table of name-token pair groupings 201 may configure the groupings for use in a deidentification process, as discussed above.

Process 300 may also include an operation 302 of storing data deidentified in association with the deidentification process in a centralized repository 104. In some embodiments, the data includes personal identifiable information or other sensitive information. Consistent with above embodiments, centralized repository 104 may take the form of a data lake, data warehouse, or other storage, and may be based on architectures such as AWS Data Lake™, Google Data Lake™, Azure Data Lake™, Cloudera Data Platform™, Databricks Unified Analytics Platform™, or others.

Process 300 may further include an operation 303 of identifying a token from the table of name-token pair groupings 103. This identification may be based on a name value of the name-token pair groupings 103 or another identifiable attribute of the name-token pair groupings 103. In some embodiments, this operation 303 also may further comprise disposing of the token from the table of name-token pair groupings. Disposing of the token may include deleting the token, scrambling the token, moving the token, etc.

In an operation 304, process 300 may further include enabling reidentification of a specific data item of the deidentified data based on the token provided from the table 103. Consistent with the above discussion, the reidentification may be based on a name attribute or other unique identifier.

Figure 4:
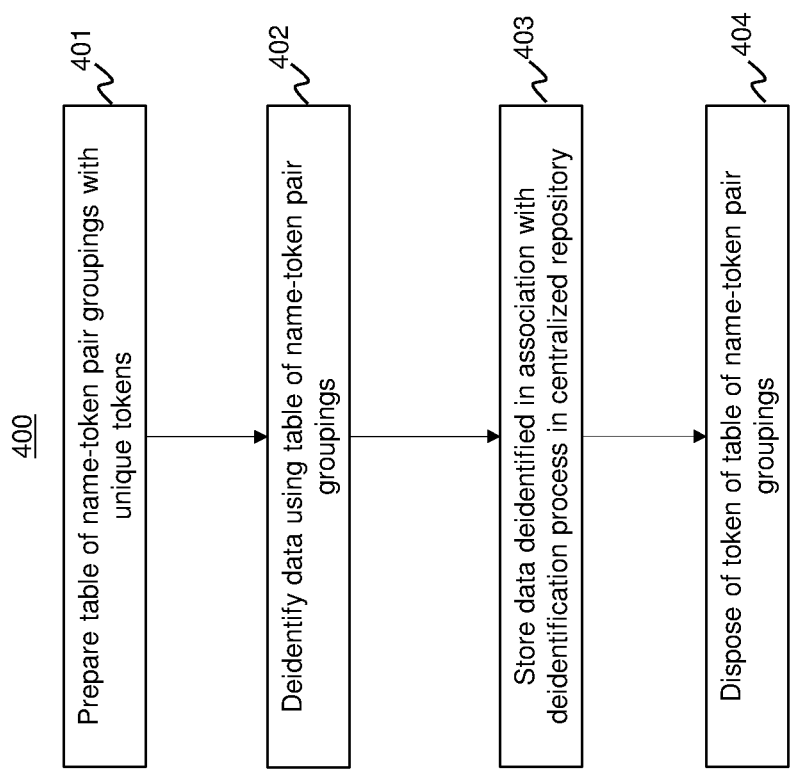
FIG. 4 illustrates an exemplary flowchart of another method for deterministic cryptographic deidentification enabling granular destruction of data, consistent with disclosed embodiments.

FIG. 4 is a block diagram of an exemplary method 400 performed by a processor of a computer or computer-based system, consistent with disclosed embodiments. In some embodiments, method 400 may be carried out at centralized repository 103, memory 101, processor(s) 102, or a separate computing system. For example, in some embodiments process 400 may be performed by a data security application running at processor(s) 102.

Process 400 may include an operation 401 of preparing a table of name-token pair groupings 103 with unique tokens. As discussed above and as illustrated in FIG. 2, a table of name-token pair groupings 201 may include a group token 202, cipher text 203, and a tag 204. The table of name-token pair groupings 201 may configure the groupings for use in a deidentification process, as discussed above.

Process 400 may also include an operation 402 of deidentifying data using table of name-token pair groupings 103. This may be performed according to the techniques discussed above. For example, deidentifying data may be based on deleting, scrambling, or moving a token associated with certain data in the table of name-token pair groupings 103.

In accordance with operation 403, process 400 may store data deidentified in association with the deidentification process in a centralized repository 104. Consistent with above embodiments, the centralized repository 104 may be a data lake, data warehouse, or other storage, and may be based on architectures such as AWS Data Lake™, Google Data Lake™, Azure Data Lake™, Cloudera Data Platform™, Databricks Unified Analytics Platform™, or others.

Process 400 may also include an operation 404 of disposing of a token of table of name-token pair groupings 103. For example, as discussed above, the token can be deleted, scrambled, moved, etc. In this manner, the deidentification of data can be highly granular. Data may be deidentified based on the token, and thus other data need not be deidentified as well. This approach thus offers significant more precision and granularity that other available techniques.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for deterministic cryptography deidentification enabling granular destruction, comprising:
   prepare a table of name-token pair groupings with unique tokens,
   wherein the table of name-token pair groupings is created by randomly assigning each name-token pair grouping based on an output of a cryptography random generator, and wherein the name-token pair groupings are configured to be used in a deidentification process and each unique token is assigned to a group of separate data,
   wherein the group is associated with a secured tag and the group creates a single entry in the table of name-token pair groupings;
   store data deidentified in association with the deidentification process, using an encryption key and the secured tag, in a centralized repository;
   identify a token from the table of name-token pair groupings; and
   enable reidentifying of a specific data item of the deidentified data based on the token provided from the table.

2. The non-transitory computer-readable medium of claim 1, wherein the operations further comprise dispose of the token from the table of name-token pair groupings.

3. The non-transitory computer-readable medium of claim 1, wherein the deterministic cryptography is performed via authenticated encryption with associated data cryptography.

4. The non-transitory computer-readable medium of claim 1, wherein the data includes personal identifiable information.

5. The non-transitory computer-readable medium of claim 1, wherein the table of name-token pair groupings includes {group-name: group-token} pairs.

6. The non-transitory computer-readable medium of claim 1, wherein the token is smaller in size than the encryption key used in the deidentification process.

7. The non-transitory computer-readable medium of claim 1, wherein the operations further comprise deidentify data using the table of name-token pair groupings.

8. A system for granular destruction of data deidentified by deterministic cryptography, comprising: one or more processors; and a memory storing instructions to cause the one or more processors to execute operations of:
   prepare a table of name-token pair groupings with unique tokens, wherein the table of name-token pair groupings is created by randomly assigning each name-token pair grouping based on an output of a cryptography random generator, and
   wherein the name-token pair groupings are configured to be used in a deidentification process and each unique token is assigned to a group of separate data,
   wherein the group is associated with a secured tag and the group creates a single entry in the table of name-token pair groupings;
   store data deidentified in association with the deidentification process, using an encryption key and the secured tag, in a centralized repository;
   identify a token from the table of name-token pair groupings; and
   enable reidentifying of a specific data item of the deidentified data based on the token provided from the table.

9. The system of claim 8, wherein the operations further comprise: identify the token from the table of name-token pair groupings; and enable reidentifying of a specific data item of deidentified data associated with the deidentification process based on the token provided from the table.

10. The system of claim 8, wherein the data includes personal identifiable information.

11. The system of claim 8, wherein the deterministic cryptography is performed via authenticated encryption with associated data cryptography.

12. The system of claim 8, wherein the table of name-token pair groupings includes {group-name: group-token} pairs.

13. The system of claim 8, wherein the token is smaller in size than the encryption key used in the deidentification process.

14. A computer-implemented method for deterministic cryptography deidentification enabling granular destruction, comprising:
   prepare a table of name-token pair groupings with unique tokens, wherein the table of name-token pair groupings is created by randomly assigning each name-token pair grouping based on an output of a cryptography random generator, and
   wherein the name-token pair groupings are configured to be used in a deidentification process and each unique token is assigned to a group of separate data, wherein the group is associated with a secured tag and the group creates a single entry in the table of name-token pair groupings;
   store data deidentified in association with the deidentification process, using an encryption key and the secured tag, in a centralized repository;
   identify a token from the table of name-token pair groupings; and
   enable reidentifying of a specific data item of the deidentified data based on the token provided from the table.

15. The computer-implemented method of claim 14, further comprising disposing of the token from the table of name-token pair groupings.

16. The computer-implemented method of claim 14, wherein the data includes personal identifiable information.

* * * * *